US006362533B1

(12) United States Patent
Morohoshi et al.

(10) Patent No.: US 6,362,533 B1
(45) Date of Patent: Mar. 26, 2002

(54) ENGINE GENERATOR UNIT

(75) Inventors: Shinichi Morohoshi; Tsutomu Hatsugai, both of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/572,744

(22) Filed: May 16, 2000

(30) Foreign Application Priority Data

May 21, 1999 (JP) .......................................... 11-142375

(51) Int. Cl.[7] .................................................. H02K 5/00
(52) U.S. Cl. ......................... 290/1 A; 322/1; 123/41.56
(58) Field of Search .............................. 290/1 A, 40 R, 290/40 C; 322/14, 1, 15, 16; 123/2, 3, 41.56

(56) References Cited

U.S. PATENT DOCUMENTS

| | | | | | |
|---|---|---|---|---|---|
| 3,714,449 | A | * | 1/1973 | De Bella | 290/1 |
| 4,595,841 | A | * | 6/1986 | Yaguchi | 290/1 A |
| 4,647,835 | A | * | 3/1987 | Fujikawa et al. | 322/1 |
| 4,907,546 | A | * | 3/1990 | Ishii et al. | 123/41.56 |
| 5,086,748 | A | * | 2/1992 | Yokoyama | 123/549 |
| 5,121,715 | A | * | 6/1992 | Nogami et al. | 123/41.7 |
| 5,212,952 | A | * | 5/1993 | Yokoyama et al. | 60/721 |
| 5,977,667 | A | * | 11/1999 | Hirose | 310/51 |
| 6,084,313 | A | * | 7/2000 | Frank | 290/40 C |
| D441,714 | S | * | 5/2001 | Yuzuriha | D13/116 |

FOREIGN PATENT DOCUMENTS

| | | |
|---|---|---|
| JP | 64-9452 | 2/1989 |
| JP | 7-24922 | 6/1995 |

OTHER PUBLICATIONS

Coleman Powermate Generators. Product ad publication. 1997.*

Coleman Powermate Maxa ER Series Electric Generators. Product ad publication. 1995.*

* cited by examiner

*Primary Examiner*—Nicholas Ponomarenko
(74) *Attorney, Agent, or Firm*—Adams & Wilks

(57) ABSTRACT

In an engine generator unit, a framework has vertical pipe frame portions at its four corners, and an engine and an electric-power generator to be driven by the engine are provided coaxially in a direction of an engine output shaft within a space defined by the framework. Fuel tank is provided above the engine and electric-power generator between a pair of support members each spanning between a different pair of the vertical pipe frame portions. Muffler connected to an exhaust-discharging end of the engine is positioned adjacent the fuel tank in a side-by-side relation to the fuel tank. Heat blocking cover covers top and side portions of the muffler and is placed between the pair of support members in such a way that a substantially entire top region of the space defined by the framework is covered with the fuel tank and the heat blocking cover. Thus, it is possible to increase the capacity of the muffler while providing for a large capacity of the fuel tank.

6 Claims, 13 Drawing Sheets

ENGINE GENERATOR UNIT

BACKGROUND OF THE INVENTION

1. Field of the Invention

The present invention relates to an engine generator unit which includes an engine and an electric-power generator to be driven by the engine that are mounted within a space defined by a pipe-shaped framework.

2. Related Prior Art

Among general-purpose power supply devices suitable for outdoor use is the so-called open-type engine generator unit which includes an engine and an electric-power generator to be driven by the engine that are mounted within a space defined by a framework. Typical examples of such an open-type engine generator unit are shown in Japanese Patent Publication No. HEI 1-9452 and Japanese Utility Model Publication HEI 7-24922.

In the engine generator unit disclosed in Japanese Patent Publication No. HEI 1-9452, the engine and electric-power generator to be driven by the engine are mounted side by side within a space defined by a framework made of pipe members. Within the space, a muffler and an air cleaner are also provided alongside of the generator and engine, respectively, and a generally flat fuel tank is provided over the engine, generator, muffler and air cleaner so as to cover a substantially entire top region of the space above the engine and generator.

Similarly, in the engine generator unit disclosed in Japanese Utility Model Publication HEI 7-24922, the engine and electric-power generator to be driven by the engine are mounted side by side within a space defined by a protective framework made of pipe members. Within the space, a muffler enclosed by a muffler cover is disposed above the generator, and a generally flat fuel tank is provided over the engine, generator and muffler so as to cover a substantially entire top region of the space above the engine, generator and muffler.

With the engine generator unit disclosed in the No. HEI 1-9452 publication, however, the capacity (size) and position of the muffler, which becomes particularly hot during operation, have to be carefully chosen (and hence are subject to considerable limitations) because the engine, generator, muffler and air cleaner are packed together in the framework-defined limited space under the fuel tank. Also, the capacity of the fuel tank has to be carefully chosen (and hence is subject to considerable limitations) in order to prevent the fuel tank from interfering with the other components provided in the small space below the fuel tank; for example, there are needs to appropriately shape the underside of the fuel tank, to provide a buffering space for avoiding thermal influences from components lying underneath the fuel tank. The engine generator unit disclosed in the No. HEI-7-24922 publication faces similar inconveniences and problems.

SUMMARY OF THE INVENTION

It is accordingly an object of the present invention to provide an improved engine generator unit which can increase the capacity of the muffler while providing for a large capacity of the fuel tank.

To accomplish the above-mentioned object, the present invention provides an engine generator unit which comprises: a framework having vertical pipe frame portions at its four corners; an engine; an electric-power generator to be driven by the engine, the engine and the electric-power generator being provided coaxially in a direction of an engine output shaft within a space defined by the framework; a fuel tank disposed above the engine and electric-power generator between a pair of support members each spanning between a different pair of the vertical pipe frame portions; a muffler connected to an exhaust-discharging end of the engine and positioned adjacent the fuel tank in a side-by-side relation thereto; and a heat blocking cover covering top and side portions of the muffler, the heat blocking cover being placed between the pair of support members in such a way that a substantially entire top region of the space defined by the framework is covered with the fuel tank and the heat blocking cover.

With the arrangements that the muffler covered with the heat blocking cover is disposed above the engine and electric-power generator and adjacent the fuel tank in a side-by-side relation thereto and the fuel tank and heat blocking cover together cover a substantially entire top region of the space defined by the framework, the muffler in the inventive engine generator unit is less subject to limitations on its capacity (size) and mounting position than in the prior counterparts where the engine, generator, muffler etc. are packed in an extremely narrow space under the fuel tank. Thus, with the present invention, the size and hence capacity of the muffler can be increased with ease. Further, the present invention can effectively reduce undesired heat radiation from the muffler to the fuel tank by closing the top and side portions of the muffler with the heat blocking cover, so that adverse thermal influences of the muffler on the fuel tank can be reliably avoided even where the muffler is located close to the fuel tank. In addition, because the muffler is not placed under the fuel tank, the empty space under the fuel tank can be accessed or used with ease, and the bottom portion of the fuel tank can be increased in size, which thereby provides for an increased overall capacity of the fuel tank.

In a preferred implementation of the present invention, a cylinder of the engine is mounted in a downwardly tilted posture with respect to a general vertical axis of the engine generator unit, and the muffler is mounted with its general plane lying substantially horizontally above the cylinder of the engine in an orientation where a longitudinal axis of the muffler crosses the engine output shaft at right angles thereto. By thus tilting the engine cylinder, the overall height or profile of the engine can be significantly lowered, which leaves a relatively large empty space above the thus-lowered engine cylinder within the space surrounded by the framework. The relatively large empty space can be utilized to position the horizontal muffler substantially at right angles to the engine output shaft, with the result that a large-size muffler can be mounted within the space defined by the framework.

Preferably, the heat blocking cover is generally in the shape of an elongate semicylindrical bowl closed at opposite ends and opening downward to cover an upper surface of the muffler, and a cooling air passage is provided between the heat blocking cover and the muffler. The outer surface of the muffler can be cooled with cooling air flowing through the cooling air passage. Further, by the presence of the cooling air passage, the heat of the muffler is not transferred directly to the heat blocking cover so that the outer surface temperature of the heat blocking cover can be prevented from getting very high.

Further, in a preferred implementation of the present invention, the muffler has an exhaust port positioned near the distal end of the cylinder of the engine mounted in the downwardly tilted posture, and a control panel is disposed on a side of the engine generator unit opposite or remote from the exhaust port. With this arrangement, the exhaust from the muffler can be prevented from flowing toward the control panel, which is therefore not thermally influenced by the muffler exhaust and can be constantly maintained in a suitable operating condition for a human operator to appropriately manipulate the panel as necessary.

Preferably, the electric-power generator is an outer-rotor/multipolar-magnet generator that has an outer rotor functioning also as a flywheel of the engine, and it further comprises an electric power controller for converting an output from the outer-rotor/multipolar-magnet generator to electric power of a predetermined frequency. Here, an output from the outer-rotor/multipolar-magnet generator, rather than the conventional synchronous generator, is converted via the electric power controller into electric power of a predetermined frequency and the outer rotor can function also as the flywheel of the engine, which can eliminate a need for a separate flywheel. The dimension of the engine generator unit in the axial direction of the engine output shaft can be reduced accordingly. In addition, because the fuel tank and muffler are placed side by side above the engine and generator, the engine generator unit can be constructed compactly into a generally cubic configuration and therefore can be installed appropriately in a small mounting space.

Preferably, the framework includes a pair of upper horizontal pipe frame portions each connecting between a predetermined pair of the vertical pipe frame portions, and the pair of upper horizontal pipe frame portions provide grips that can be suitably used when the engine generator unit is to be carried by hand. Such upper horizontal pipe frame portions allow the engine generator unit of the present invention to be carried or handled with utmost facility.

With the arrangements that the engine and the electric-power generator are provided coaxially in the direction of the engine output shaft within the mounting space defined by the framework, the engine cylinder is mounted in the downwardly tilted posture and the muffler is disposed above the engine and generator and adjacent the fuel tank in a side-by-side relation thereto, the inventive engine generator unit can be reliably kept in good weight balance with its center of gravity set substantially set at the center of the space defined by the framework. As a result, the engine generator unit can be carried and handled with great facility, using the upper horizontal pipe frame portions as grips.

BRIEF DESCRIPTION OF THE DRAWINGS

Certain preferred embodiments of the present invention will be described in greater detail with reference to the accompanying sheets of drawings, in which.

DETAILED DESCRIPTION OF THE PREFERRED EMBODIMENTS

The following description is merely exemplary in nature and is in no way intended to limit the invention, its application or uses.

Figure 1:
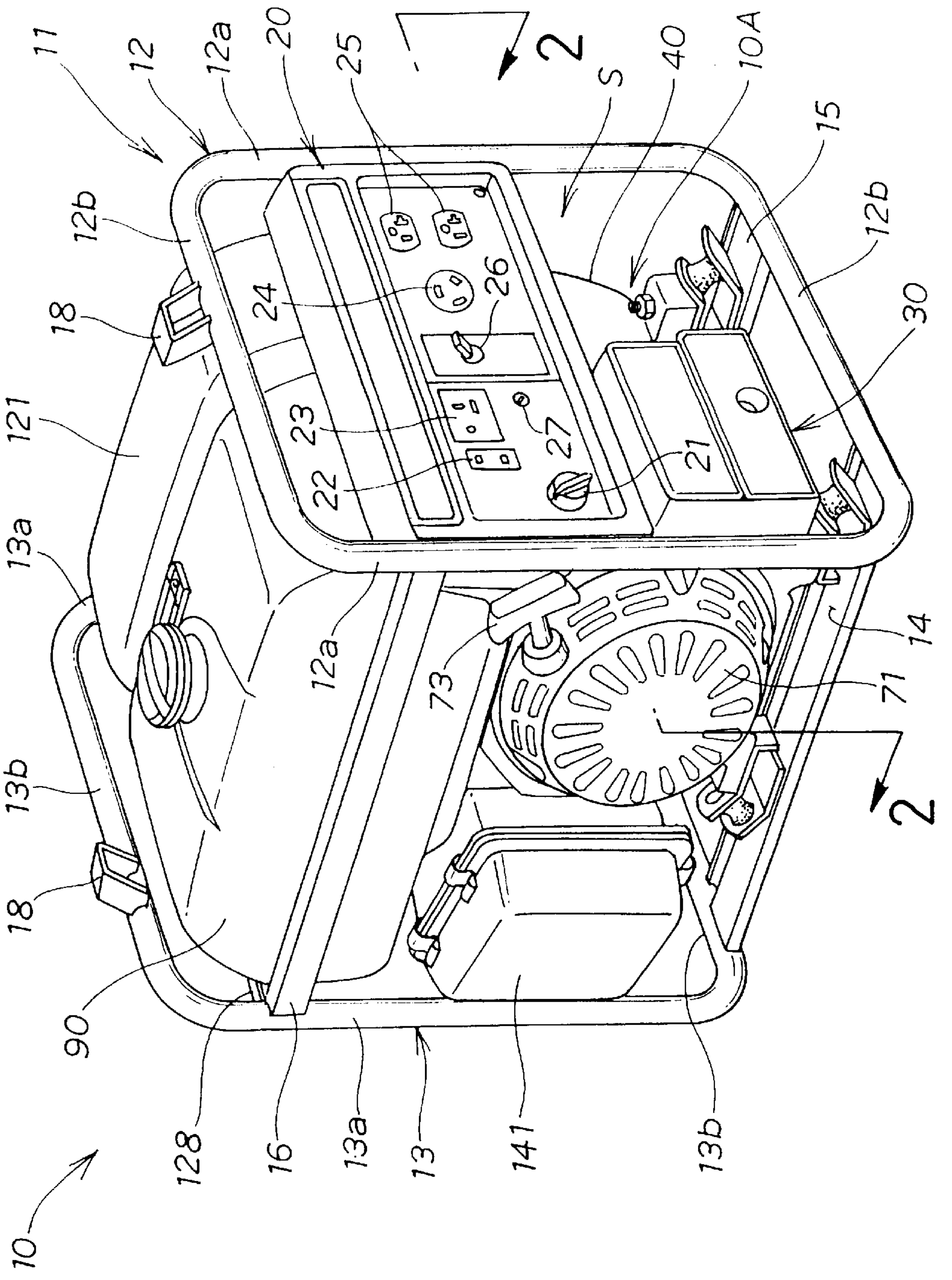
FIG. 1 is a perspective view showing a general construction of an engine generator unit in accordance with a preferred embodiment of the present invention.
Figure 2:
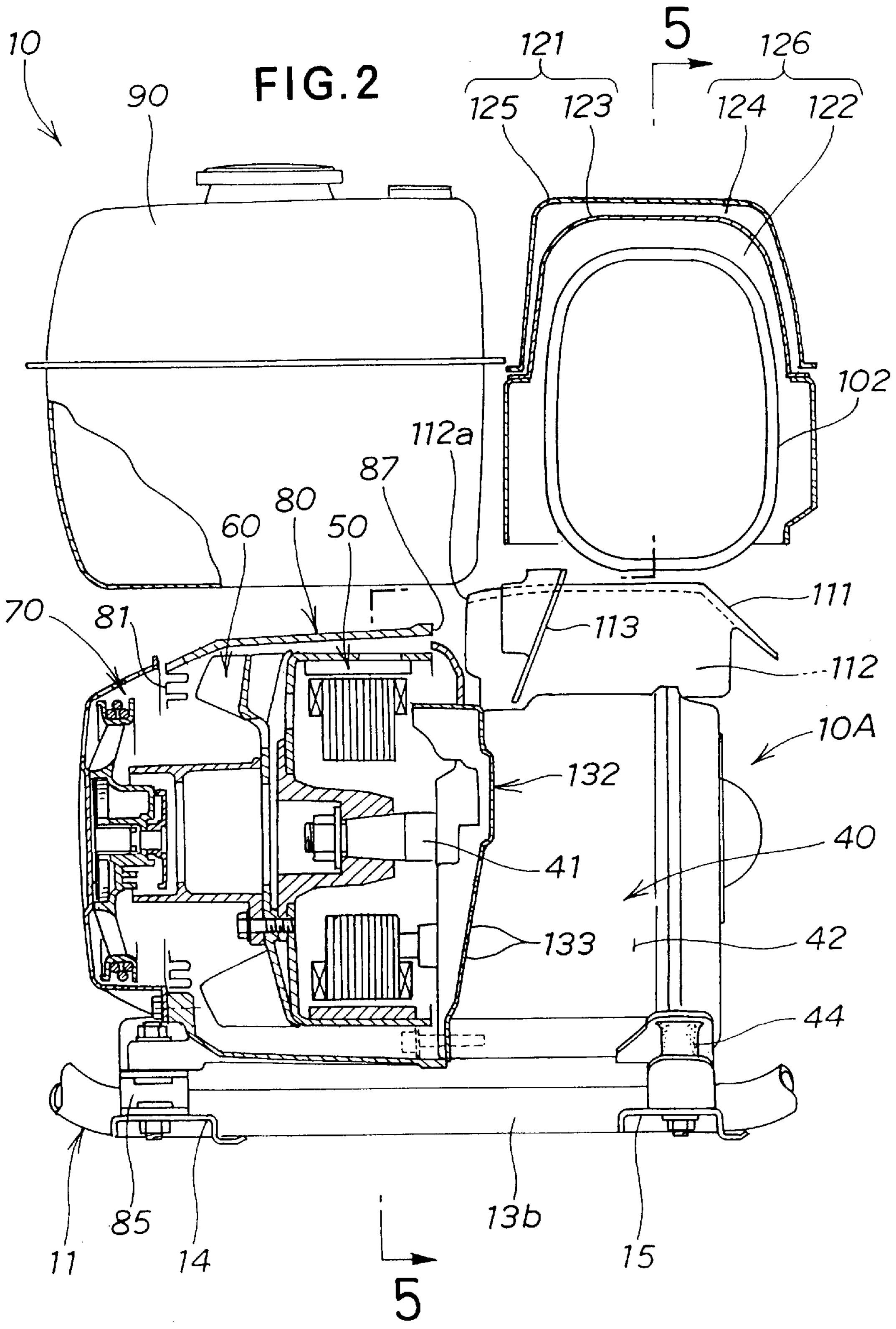
FIG. 2 is a vertical sectional view taken along the 2—2 line of FIG. 1.

FIG. 1 is a perspective view showing a general construction of an engine generator unit in accordance with a preferred embodiment of the present invention. As shown, this engine generator unit 10 is of the open type which includes a pipe framework 11 that, in the illustrated example, is generally formed into a hollow cubic shape and composed of front and rear generally-square or rectangular pipe-shaped frames 12 and 13. The generator unit 10 has a control panel 20 fixed to the front frame in an upper hollow region defined by the rectangular front frame, and an electric power controller 30 is disposed in a lower hollow region defined by the front frame. The engine generator unit 10 also includes, within a mounting space S between the front and rear frames 12 and 13, an engine 40, a fuel tank 90, an air cleaner 141, an electric power generator 50 (FIG. 2) and a muffler 102 (FIG. 2).

Figure 9:
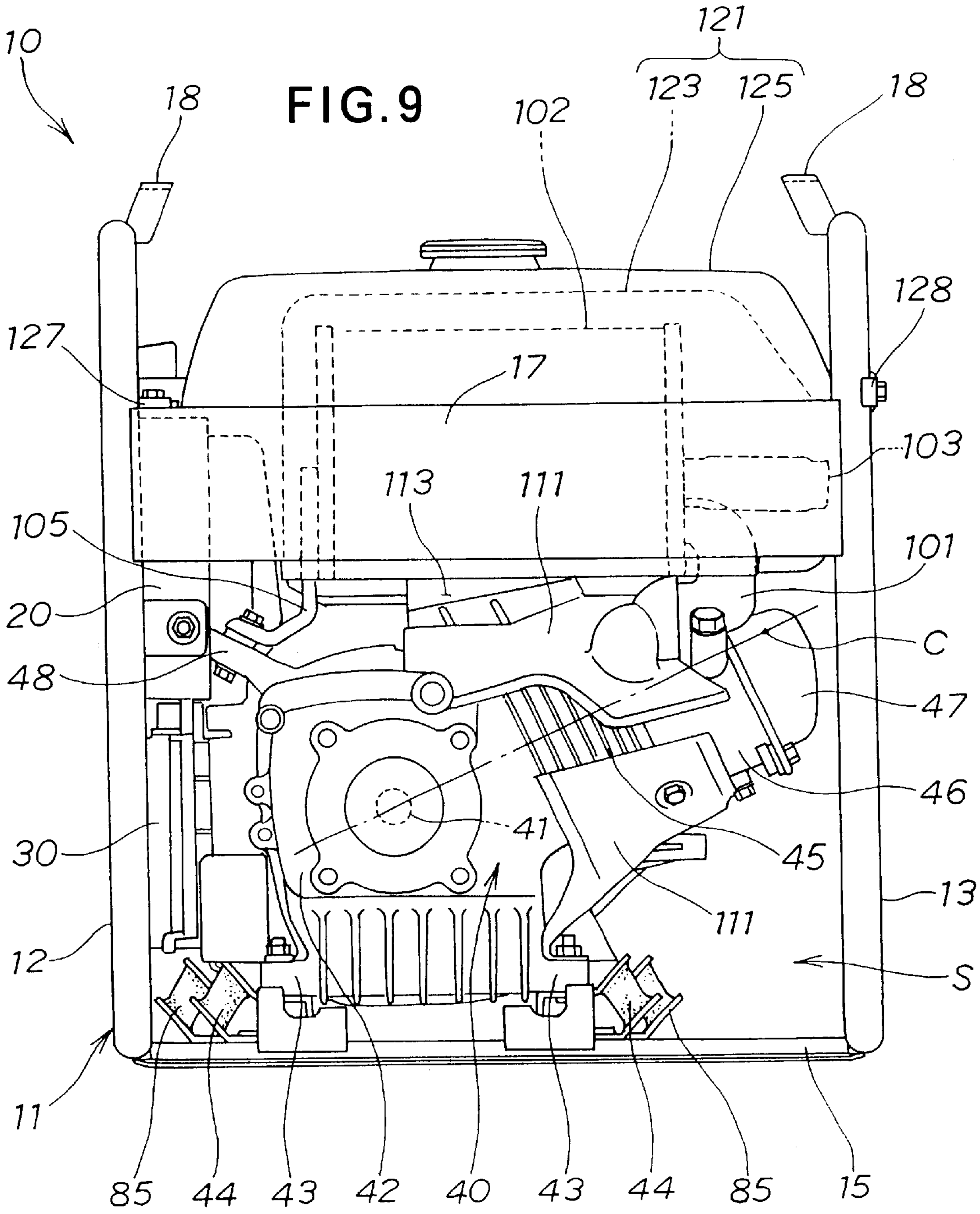
FIG. 9 is a right side view of the engine generator unit in accordance with the preferred embodiment of the present invention.

The rectangular front and rear frames 12 and 13 of the pipe framework 11 are interconnected by a pair of left and right lower beams 14 and 15 and a pair of left and right upper beams 16 and 17 (the right upper beam 17 is not visible in FIG. 1 and shown in FIG. 9). The rectangular front frame 12 consists of a pair of left and right vertical pipe frame portions **12*a* and a pair of horizontal pipe frame portions 12*b*, and similarly the rectangular rear frame 13 consists of a pair of left and right vertical pipe frame portions 13*a* and a pair of horizontal pipe frame portions 13*b*. Thus, the pipe frame 11 has the vertical pipe frame portions 12*a* and 13*a*** at its four corners as viewed in plan.

On corresponding positions of the opposed upper horizontal pipe frame portions **12*b* and 13*b*, the pipe frame 11 includes a pair of positioning supports 18 that are used when another engine-operated generator unit (not shown) of the same construction is to be superposed on the engine generator unit 10. More specifically, the positioning supports 18 are provided on the upper horizontal pipe frame portions 12*b* and 13*b*** so that they can engage the other engine generator unit against displacement in the front-rear and left-right directions.

The upper horizontal pipe frame portions **12*b* and 13*b*, connecting between the vertical pipe frame portions 12*a* of the front frame 12 and between the vertical pipe frame portions 13*a* of the rear frame 13, respectively, are opposed to each other at a same level of the unit 10 and thus can be suitably used as grips when the unit 10 is to be carried by hand. Namely, the upper horizontal pipe frame portions 12***b* and 13*b* allow the engine generator unit 10 of the present invention to be carried or handled with utmost facility.

The control panel 20 includes various electrical components that constitute an engine control, an electric-power take-out section, etc. More specifically, on the control panel 20, there are provided an engine switch 21 for turning on an engine ignition system, an ignition controller 22 for controlling the engine ignition, a battery charger socket 23 for charging an external battery, a first take-out socket 24 for taking out a high-level A.C. current, and two second take-out sockets 25 each for taking a current lower in level than that taken out by the first take-out socket 24. Also provided on the control panel 20 are a circuit breaker 26 for breaking the electric circuit when the output current from any one of the sockets 24 and 25 exceeds a predetermined threshold value, and a frequency changing switch 27 for changing the frequency of the output current from the sockets 24 and 25. The electric power controller 30 converts the output frequency of the generator 50 into a predetermined frequency and may comprise, for example, a cycloconverter.

FIG. 2 is a vertical sectional view taken along the line 2—2 of FIG. 1, which shows the engine 40, generator 50, fuel tank 90 and muffler 102 as viewed from the front of the engine generator unit 10; note that only a lower end portion of the framework 11 is shown in this figure for simplicity of illustration.

Within the space surrounded by the pipe frame 11, as seen in FIG. 2, the engine 40 and generator 50 capable of being driven by the engine 40 are positioned side by side in an axial direction of an engine output shaft 41, and the fuel tank 90 and muffler 102 are disposed above the generator 50 and engine 40. When the engine generator unit 10 is viewed from its front as in FIG. 2, the engine 40 is located in the lower right of the generator unit 10, the generator 50 located in the lower left of the generator unit 10, the fuel tank 90 located above the generator 50, and the muffler 102 located above the engine 40 that has an overall height significantly reduced by placing the engine cylinder in a downwardly tilted posture with respect to a general vertical axis of the generator unit 10 as will be later described. The fuel tank 90 and muffler 102 are placed substantially horizontally (with their general planes lying substantially horizontally) in a side-by-side relation to each other. Because the fuel tank 90 and muffler 102 are thus mounted side by side right above the generator 50 and engine 40, the engine-operated generator unit 10 can be constructed compactly into a generally-cubic overall configuration, so that it can be appropriately installed even in a relatively small space with its center of gravity significantly lowered.

Figure 3:
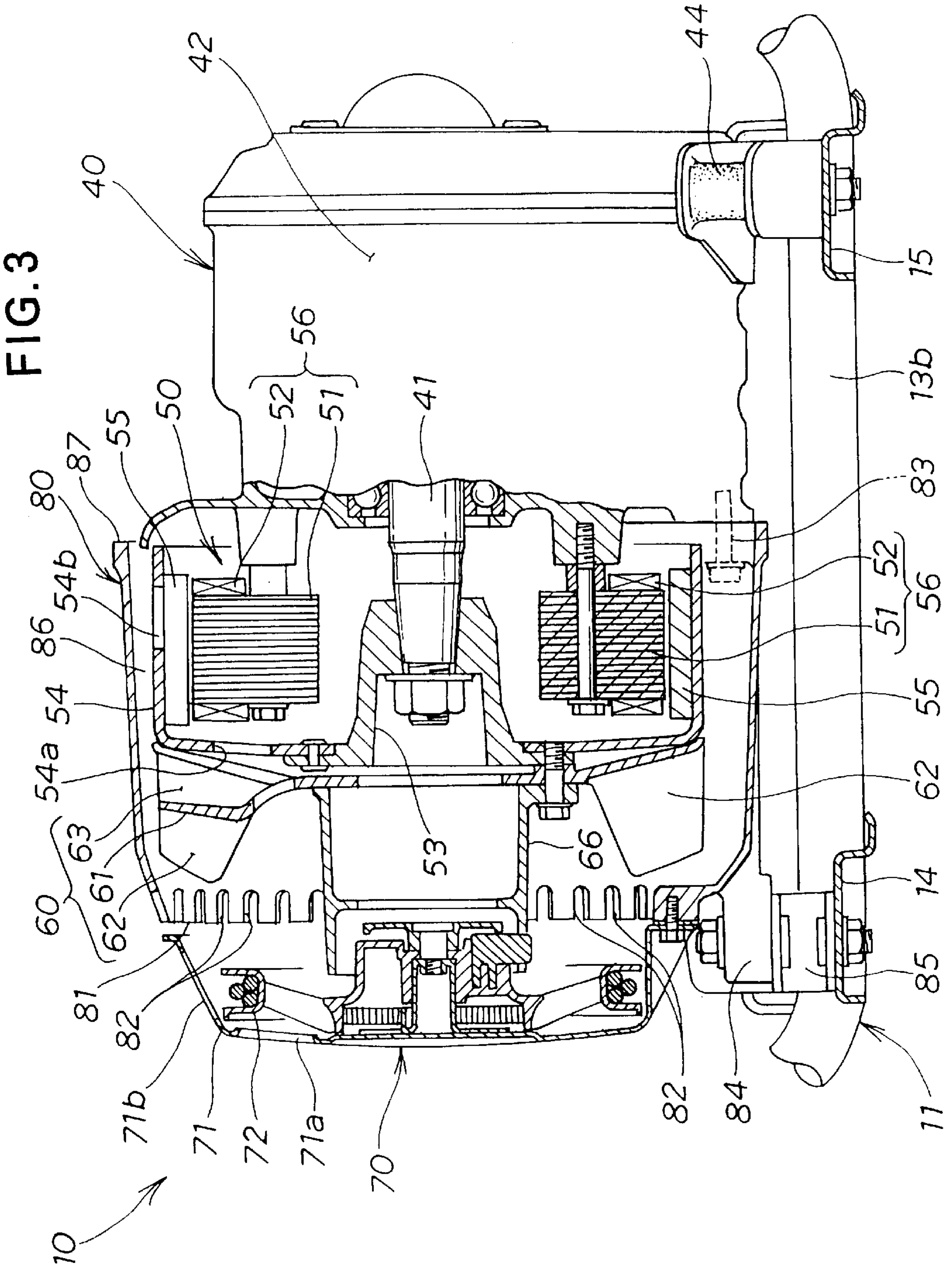
FIG. 3 is a partly-sectional front view of the engine-operated generator unit shown in FIG. 1.

FIG. 3 is a partly-sectional front view of the engine-operated generator unit 10 with principal components of the generator unit 10 of FIG. 2 depicted on an enlarged scale. To the pipe frame 11 of the generator unit 10, there are fixed the engine 40, the generator 50 operatively connected the engine 40, a centrifugal cooling fan device 60 disposed on one side of the generator 50 remote from the engine 40 for introducing or sucking in outside air for cooling purposes to be described later, a recoil starter 70 connected to the cooling fan device 60 via a connecting cylinder 66, and a fan cover 80 enclosing the generator 50 and cooling fan device 60. Outer rotor 54, cooling fan device 60 and recoil starter 70 are mounted coaxially relatively to the engine output shaft 41.

The electric-power generator 50 in the preferred embodiment is an outer-rotor/multipolar-magnet generator whose outer rotor 54 is supported by the engine output shaft 41 in a cantilever fashion. More specifically, the generator 50 is made up of an inner stator 56 including a stator core 51 in the form of axially-stacked rings fixed to a side wall of the crankcase 42 and a plurality of coils wound on the stator core 51, the outer rotor 54 generally in the shape of a cup and mounted on the engine output shaft 41 by means of a hub 53, and a plurality of magnets 55 secured to the inner surface of the outer rotor 54.

The cup-shaped outer rotor 54 surrounds the inner stator 56 (i.e., the stator core 51 and coils 52) and has its one end (cup bottom portion) coupled with the centrifugal cooling fan device 60; thus, the centrifugal cooling fan device 60 having a relatively large diameter can be mounted reliably in a simple manner. The large diameter of the centrifugal cooling fan device 60 can suck in a sufficient amount of air for cooling the engine 40 and generator 50.

The outer rotor 54 in the preferred embodiment also functions as a cantilevered flywheel, which can eliminate a need for a separate flywheel. Thus, the dimension of the generator unit 10 in the axial direction of the engine output shaft 41 can be reduced accordingly to permit downsizing of the framework 11, so that the generator unit 10 can be reduced in overall size. The cup-shaped outer rotor 54 also has air holes 54*a* and 54*b* in the cup bottom portion and cylindrical side wall.

Mounting accuracy of the fan cover 80 relative to the engine output shaft 41 need not be very high because it only has to enclose the outer-rotor-type generator 50 and the cooling fan device 60 attached to the outer rotor 54.

The fan cover 80 is generally in the form of a cylinder extending horizontally along the engine output shaft 41 close to the engine 40. Specifically, the fan cover 80 has a cooling-air inlet portion 81 at its outer end remote from the engine 40, through which the outside air is introduced into the generator unit 10 by means of the cooling fan device 60 generally located inwardly of the cooling-air inlet portion 81. More specifically, the cooling-air inlet portion 81 has at its outer end a plurality of parallel air sucking-in slits 82 extending along the longitudinal direction of the fan cover 80, and a recoil starter cover 71 is attached to the cooling-air inlet portion 81 outwardly of the cooling-air inlet portion 81.

By means of the recoil starter cover 71, the recoil starter 70 supports a pulley 72 for rotation about an axis lying in horizontal alignment with the engine outputs haft 41 and operatively connects the pulley 72 with the cooling fan device 60. The recoil starter cover 71 has a plurality of air holes 71*a*.

At the other or inner end adjacent the engine 40, on the other hand, the cooling fan cover 80 is secured to the engine crankcase 42 by means of bolts 83 (only one of which is shown in FIG. 3) while forming a cooling-air outlet portion 87 for blowing the cooling air onto the outer peripheral surface of the engine 40.

Figure 4:
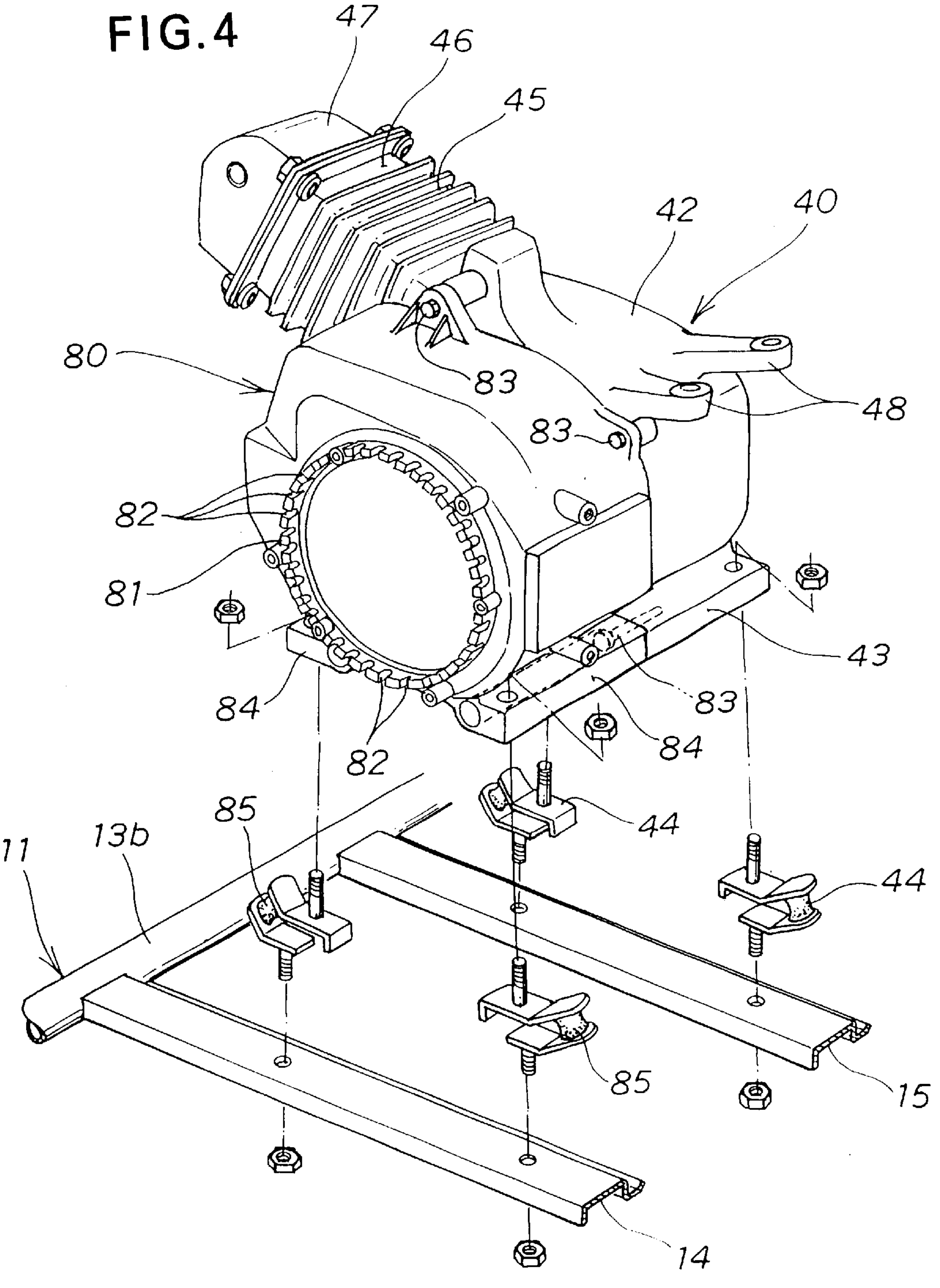
FIG. 4 is a perspective view showing a fan cover attached directly to an engine shown in FIG. 1.

FIG. 4 is a perspective view showing the cooling fan cover 80 secured directly to the engine crankcase 42. The cooling fan cover 80 is made of die-cast aluminum alloy that has a high thermal conductivity and thus achieves a superior heat-radiating performance. By being made of such die-cast aluminum alloy and directly secured to the engine 40, the cooling fan cover 80 can function as a very efficient heat radiator. Namely, the heat accumulated in the outer wall of the engine crankcase 42 can be readily transferred to the directly-secured fan cover 80. This way, in the preferred embodiment, the outer surface of the engine 40 and the entire area of the cooling fan cover 80 can together provide an increased heat-radiating surface for the engine 40. With such an increase in the heat radiating surface, the engine 40 can be cooled with increased efficiency, as a result of which the oil temperature and the like in the engine 40 can also be kept low with efficiency.

Further, as shown in FIG. 4, a pair of supporting leg members 43 (only one of which is visible here) are secured to opposite (front and rear) end portions of the underside of the engine 40. Similarly, a pair of supporting leg portions 84 are secured to opposite ends of the underside of the cooling fan cover 80. These supporting leg members 43 and 84 of the engine 40 and cooling fan cover 80 are placed transversely on the above-mentioned left and right lower beams 14 and 15 and bolted to the beams 14 and 15 with shock absorbing members (vibration-isolating mounts) 44 and 85 interposed therebetween.

Because the cooling fan cover 80 made of the die-cast aluminum alloy has relatively great rigidity and such a rigid cooling fan cover 80 is firmly secured to the engine 40 that is also rigid enough in general, the engine generator unit 10 of the present invention can provide a rugged assembly of the fan cover 80 and engine 40 which can be reliably retained on the framework 11 with an appropriate shock absorbing or cushioning capability.

Referring back to FIG. 2, at least part of the engine 40 is covered with an engine shroud 111 with a relatively large empty space 112 left therebetween, and the empty space 112 serves as an air passage through which air is allowed to pass to cool the engine 40 (hereinafter referred to as an "engine-cooling air passage" 112). Inlet portion 112*a* to the interior of the engine-cooling air passage 112 faces the cooling-air outlet portion 87 of the fan cover 80.

The muffler 102 is covered or closed at least at its top end portion with a heat blocking cover 121 which is a dual-cover structure including an inner cover 123 covering the muffler 102 with a predetermined first gap 122 formed therebetween and an outer cover 125 covering the outer surface of the inner cover 123 with a predetermined second gap 124. The inner cover 123 of the dual heat blocking cover structure 121 is generally in the shape of a halved cylinder (elongate semicylindrical bowl) closed at opposite ends and opening downward to cover an almost entire outer surface of the muffler 102 except for a lower end surface of the muffler 102. The outer cover 125 is also generally in the shape of a halved cylinder (elongate semicylindrical bowl) closed at opposite ends and opening downward to cover an upper surface of the inner cover 123.

The first gap 122 between the inner cover 123 and the muffler 102 functions as a first cooling-air path, while the second gap 124 between the inner cover 123 and the outer cover 125 functions as a second cooling-air path. Thus, these first and second cooling-air paths 122 and 124 together constitute a divided muffler-cooling air passage 126 separate from the engine-cooling air passage 112.

As further shown in FIG. 2, the engine shroud 111 has an air guide 113 integrally formed thereon for diverting a proportion of the cooling air from the engine-cooling air passage 112 upwardly into the muffler-cooling air passage 126. With this air-diverting guide 113, the cooling air drawn in from the outside via the cooling fan device 60 having cooled the generator 50 is allowed to flow into both the engine-cooling air passage 112 and the muffler-cooling air passage 126, so that the engine 40 and muffler 102 can be cooled by the same cooling air having cooled and passed the upstream generator 50. Because the air guide 113 is used only to divert a proportion of the cooling air within the engine shroud 111, it can be of simple structure.

Figure 5:
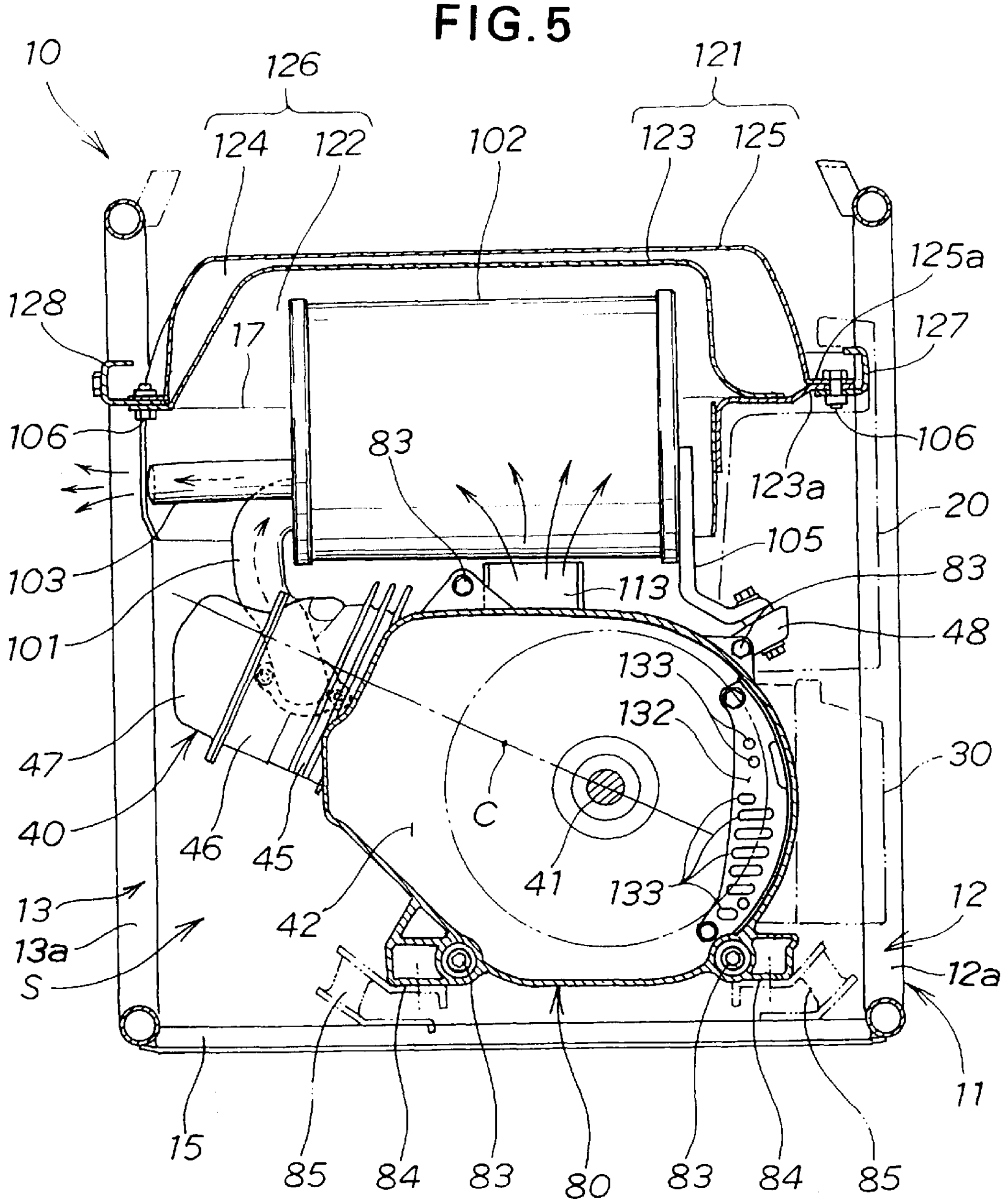
FIG. 5 is a vertical sectional view taken along the 5—5 line of FIG. 2.

FIG. 5 is a vertical sectional view taken along the 5—5 line of FIG. 2, which shows the left side of the framework 11, engine 40 and muffler 102 and where illustration of the generator 50 is omitted for simplicity. In the preferred embodiment, as shown in FIG. 5, the engine 40 is constructed to have a lower profile, i.e., a smaller height, than the conventional counterparts by tilting the cylinder 45, cylinder head 46 and head cover 57, i.e., the longitudinal axis of the engine 40, rearwardly downward about the engine output shaft 41 with respect to the general vertical axis of the unit 10, so as to be located obliquely upward of the engine output shaft 41.

As further shown in FIG. 5, the muffler 102 is connected via an exhaust pipe 101 to an exhaust port of the engine 40.

As also seen from FIG. 5, the horizontal muffler 102 extends to cross the engine output shaft 41, substantially at right angles thereto, above the engine cylinder 45 and is secured to an engine bracket 48. More specifically, tilting the cylinder 45 as above can lower the overall height or profile of the engine 40 and leaves a relatively large empty space above the thus-lowered cylinder 45. This relatively large empty space is utilized to position the horizontal muffler 102 to cross the engine output shaft 41 substantially at right angles thereto; this arrangement can further increase the capacity of the muffler 102.

Further, an exhaust port (tailpipe) 103 of the muffler 102 is positioned near the distal end of the engine cylinder 45 and extends in the same rearward direction as the cylinder 41 extends from the engine output shaft 41 in the downwardly tilted posture, and the control panel 20 is positioned on the front of the generator unit 10 opposite or remote from the muffler exhaust port 103, as denoted by phantom line.

In the preferred embodiment thus arranged, the exhaust from the muffler 102 is prevented from flowing toward the control panel 20, which is therefore not thermally influenced by the muffler exhaust and can be constantly maintained in a suitable operating condition for a human operator to appropriately manipulate the panel 20 as necessary.

The inner and outer covers 123 and 125 of the dual heat blocking cover structure 121 are elongate covers spanning between the front and rear frames 12 and 13 and secured to the frames 12 and 13 with their opposite end flanges 123*a* and 125*a* superposed on each other. Further, a front support member 127 is provided between the vertical pipe frame portions 12*a* of the front frame 12 while a rear support member 128 is provided between the vertical pipe frame portions 13*a* of the rear frame 13. Two pairs of the superposed end flanges 123*a* and 125*a* are bolted to the front and rear support members 127 and 128, respectively, by which the dual heat blocking cover structure 121 is secured between the front and rear frames 12 and 13 above the muffler 102.

Figure 6:
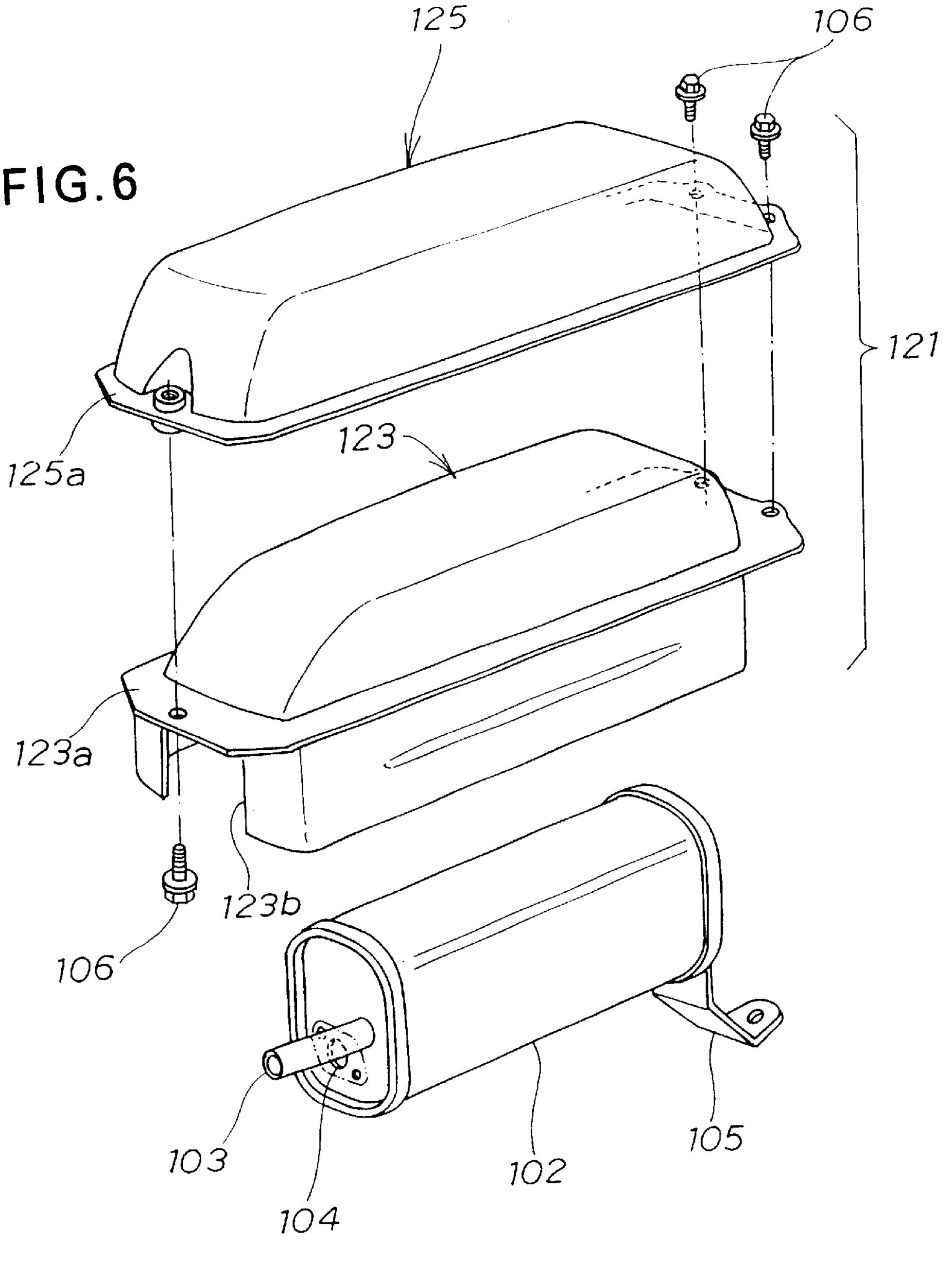
FIG. 6 is an exploded perspective view showing a muffler and a heat blocking cover in the preferred embodiment.

FIG. 6 is an exploded perspective view showing the muffler 102 and heat blocking cover 121 and is particularly explanatory of a relationship between the muffler 102 and the inner and outer covers 123, 125 in the preferred embodiment. As shown, the inner cover 123 has an opening 123*b* in its rear wall to avoid mechanical interference with the tailpipe 103 of the muffler 102. The muffler 102 also has an exhaust inlet and a stay 105, and reference numeral 106 is a bolt for insertion through the end flanges of the inner and outer covers 123 and 125.

Figure 7:
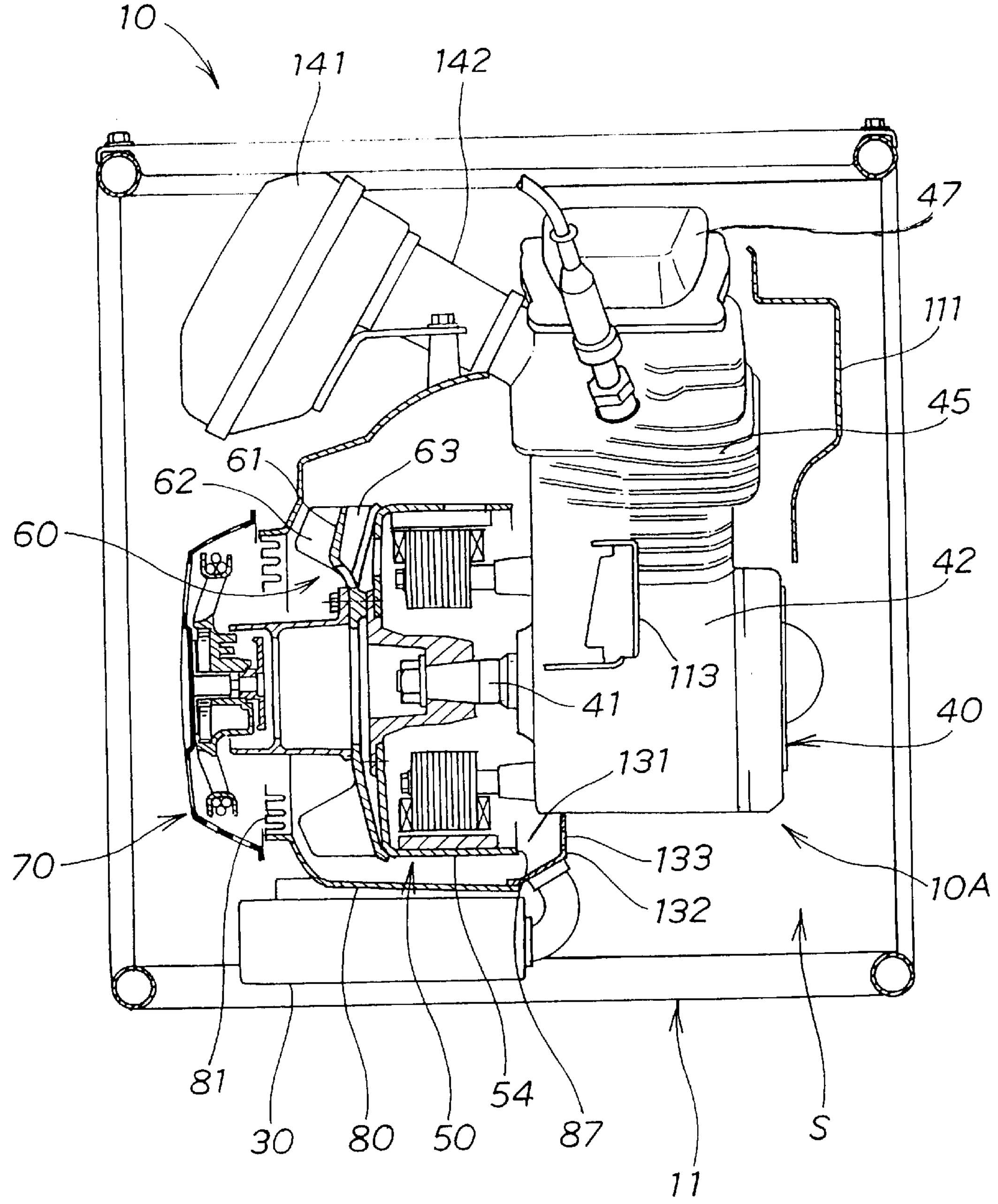
FIG. 7 is a sectional top plan view of the engine generator unit in accordance with the preferred embodiment of the present invention, which particularly shows the engine and generator.

FIG. 7 is a sectional top plan view of the engine generator unit 10 in accordance with the preferred embodiment of the present invention, which particularly shows the engine 40 and generator 50 with the fuel tank 90, muffler 102 and control panel 20 removed for clarity. As shown in the figure, a set of the engine 40, generator 50, electric power controller 30, engine shroud 111, air cleaner 141 and carburetor 142 is mounted snugly within a square space defined by the framework 11, and the air guide 113 of the engine shroud 111 has a generally U-shape opening toward the cooling fan cover 80 as viewed in top plan.

As viewed in top plan, the cooling fan cover 80 bulges greatly along the engine cylinder 45, and thereby allows the cooling air to be readily introduced into the space within the engine shroud 111. The cooling fan device 60 is a double-side fan which includes a main fan 62 formed integrally on the rear surface of a base 61 and an auxiliary fan 63 formed integrally on the front surface of the base 61. The main fan 62 functions to direct the outside air, introduced through the main cooling-air inlet portion 81, toward the engine 40, while the auxiliary fan 63 functions to direct the outside air, introduced through a plurality of auxiliary cooling-air inlets 133 and passed through the generator 50, toward the engine 40.

The cooling fan cover 80 has a predetermined gap 131 adjacent the engine 40 so that the gap 131 serves as the auxiliary cooling-air inlets 133 for drawing in the outside air to cool the interior of the generator 50. Namely, the gap 131 having a relatively large size is formed between one end of the fan cover 80 and one side of the crankcase 52 remotely from the engine cylinder 45, and this gap 131 is closed by a plate 132 having the auxiliary cooling-air inlets 133 formed therein. The auxiliary air inlets 133 are formed in the plate 132 inwardly of the outer rotor 54 so as to be close to the center of the centrifugal cooling fan 60. Because the central area of the centrifugal cooling fan 60 is subject to a greater negative pressure, the outside air can be efficiently sucked in through the auxiliary cooling-air inlets 133 located close to the center of the cooling fan 60 and then directed through the interior space of the generator 50 to the auxiliary fan 63. The closing plate 132 bolted to the engine 40 and the auxiliary cooling-air inlets 133 formed in the closing plate 132 are illustratively shown in FIG. 5.

Figure 8:
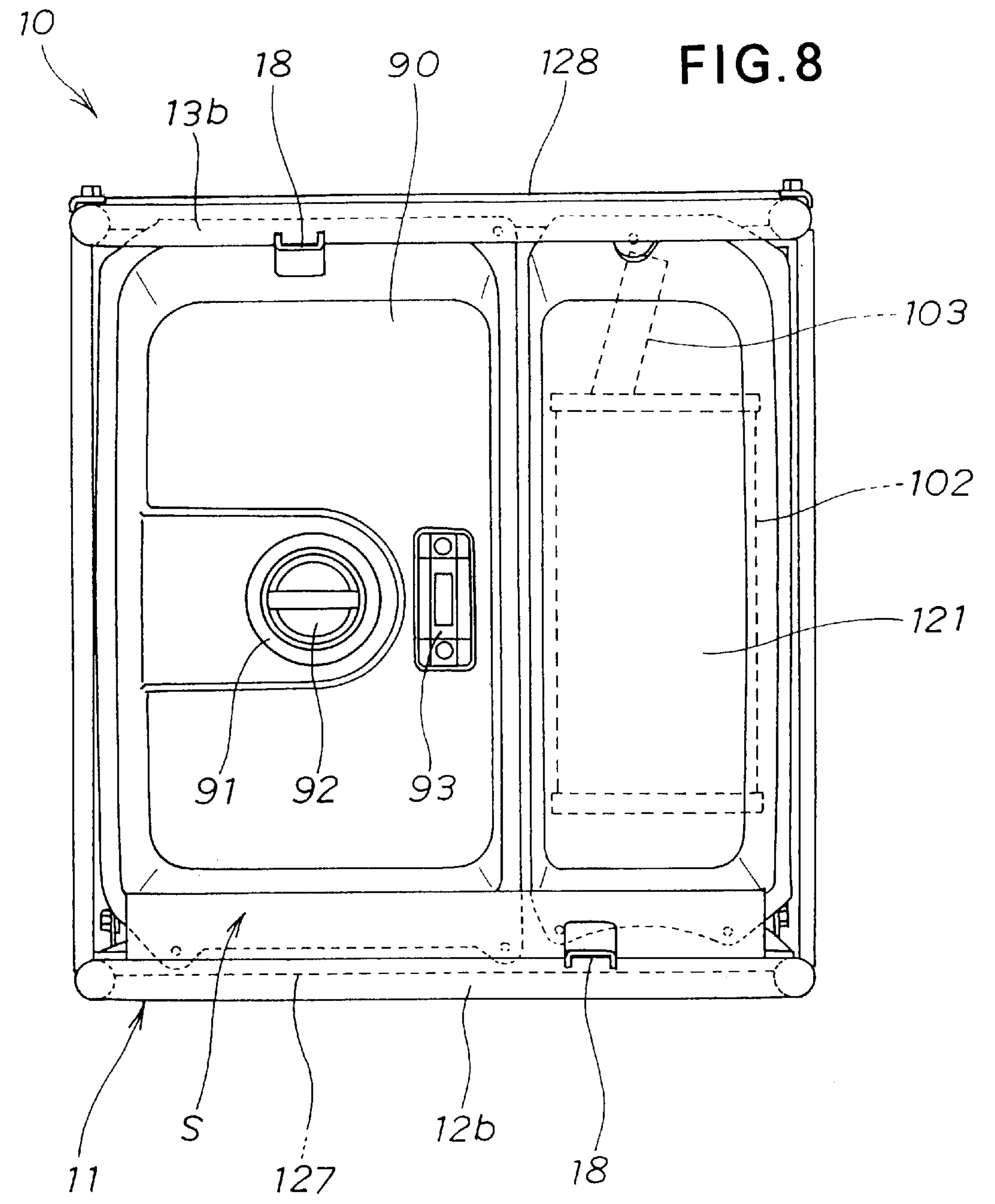
FIG. 8 is a top plan view of the engine generator unit in accordance with the preferred embodiment of the present invention.

FIG. 8 is a top plan view of the engine generator unit 10 in accordance with the preferred embodiment of the present invention. As shown, the muffler 102 is disposed adjacent the fuel tank 90 in a side-by-side relation thereto and covered at its top with the heat blocking cover 121. Further, the fuel tank 90 and heat blocking cover 121 span horizontally between and secured to the front and rear support members 127 and 128, so that the entire top region of the space defined by the pipe-shaped framework 11 is substantially closed by the fuel tank 90 and heat blocking cover 121. In this figure, reference numeral 91 represents an oil filler hole, 92 an oil filler cap, and 93 an oil surface gauge.

FIG. 9 is a right side view of the engine generator unit 10 in accordance with the preferred embodiment of the present invention, which particularly shows that the muffler 102 is supported by the engine 40 via the above-mentioned exhaust pipe 101 and stay 105 and that the cylinder 45 and cylinder head 46 of the engine 40 are covered with a pair of upper and lower engine shroud members 111.

Figure 10:
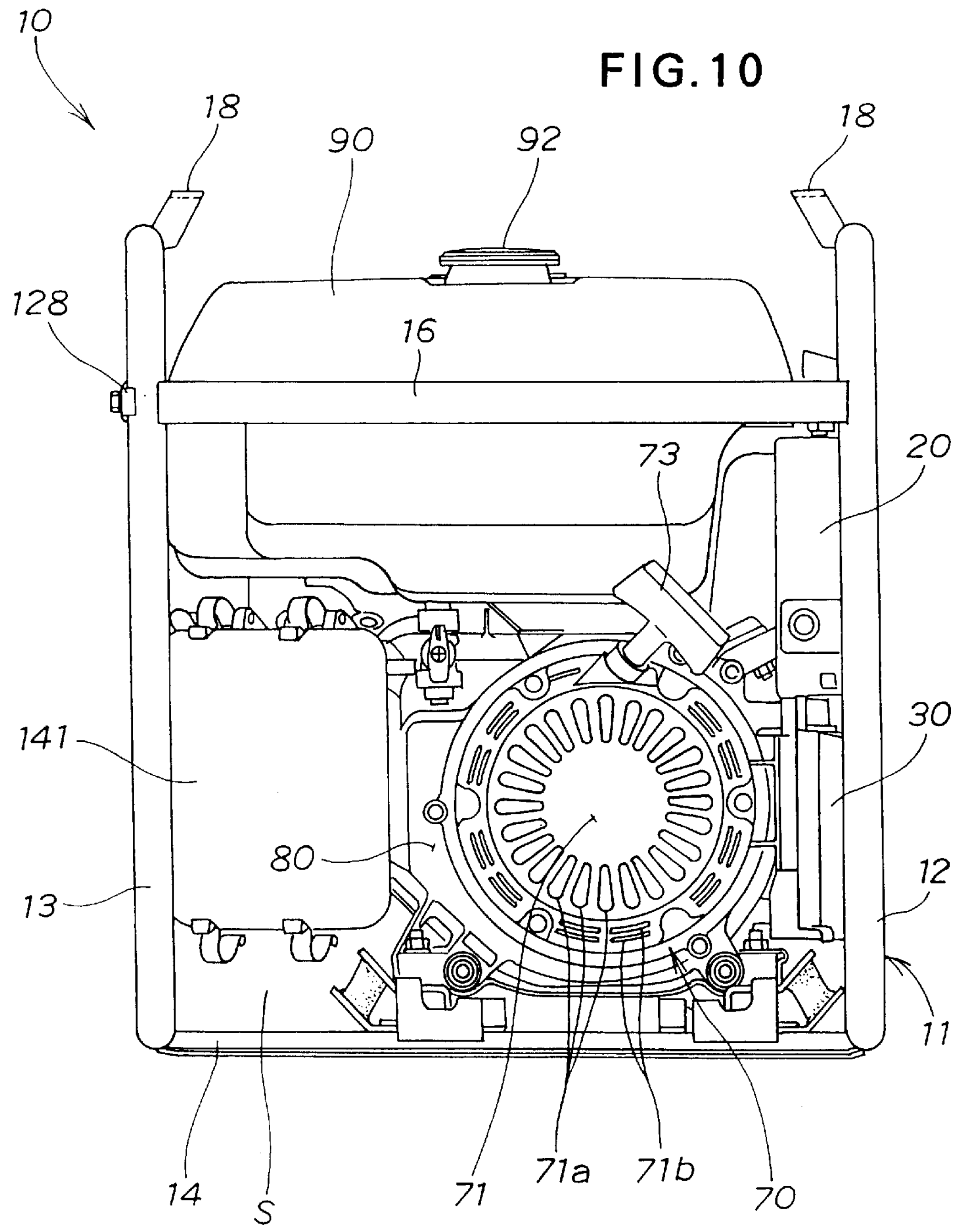
FIG. 10 is a left side view of the engine generator unit in accordance with the preferred embodiment of the present invention.

FIG. 10 is a left side view of the engine generator unit 10 in accordance with the preferred embodiment of the present invention, which particularly shows that an actuating handle 73 of the recoil starter 70 is provided on a front left portion of the engine generator unit 10 and the air cleaner 141 is provided on a rear left portion of the unit 10.

Figure 11:
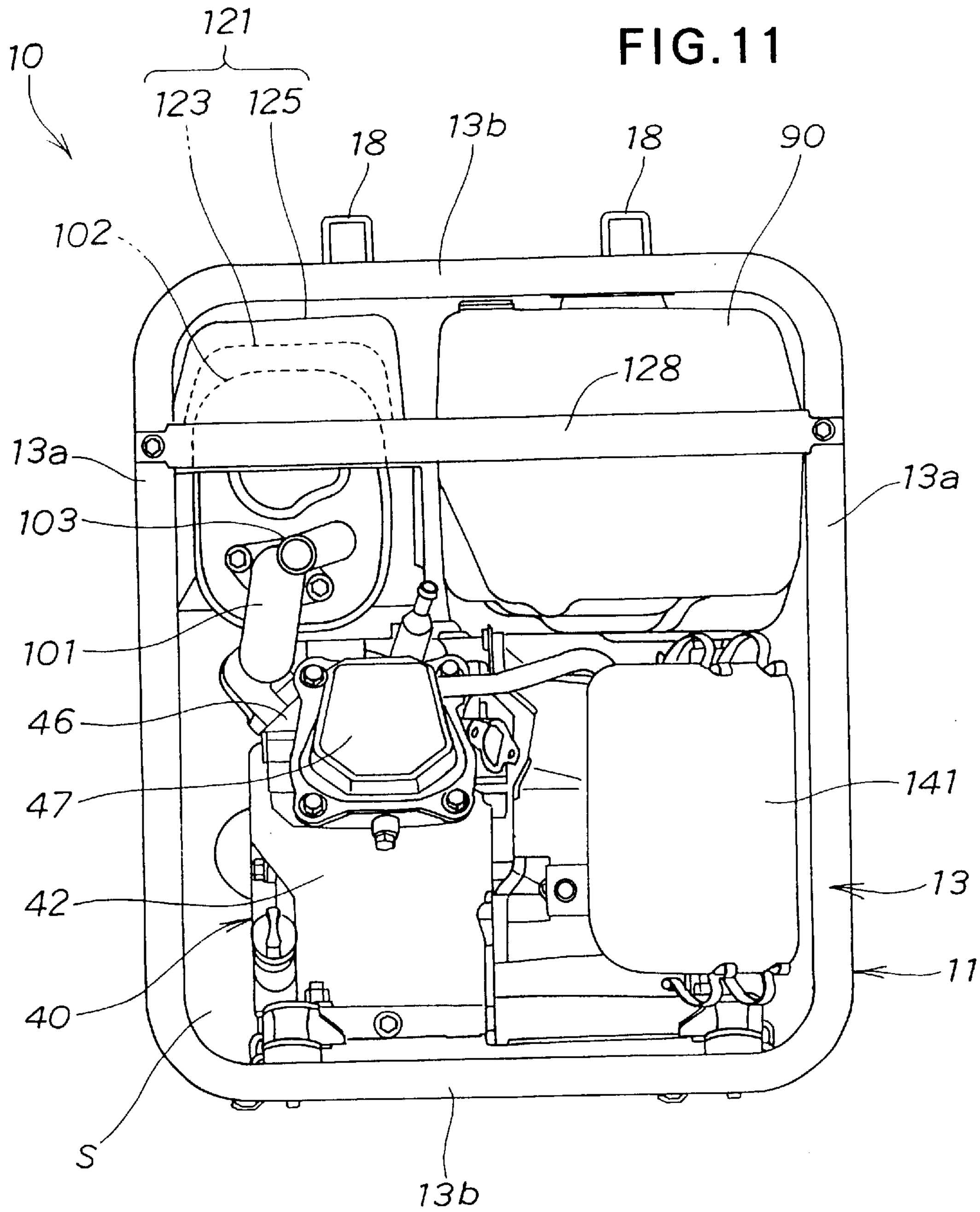
FIG. 11 is a rear view of the engine generator unit in accordance with the preferred embodiment of the present invention.

Further, FIG. 11 is a rear view of the engine generator unit 10 in accordance with the preferred embodiment of the present invention, which particularly shows that the muffler 102 is connected via the exhaust pipe 101 to the engine cylinder head 46 and that the rear support member 128 is bolted at its opposite ends to the vertical pipe frame portions 13*a* of the rear frame 13.

Now, a description will be made about exemplary behavior of the engine generator unit 10 constructed in the above-mentioned manner, with particular reference to FIGS. 12 and 13.

Figure 12:
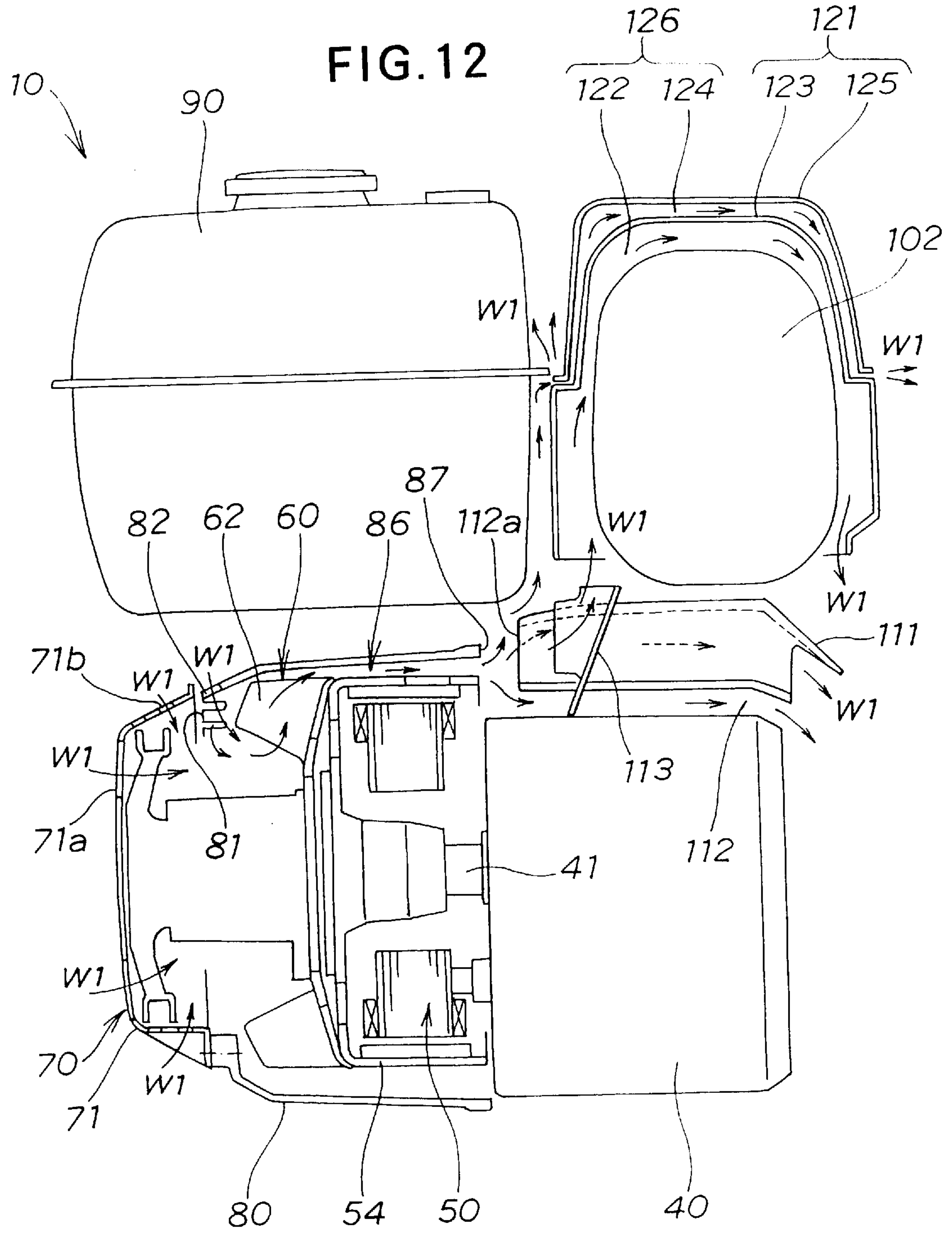
FIG. 12 is a view explanatory of behavior of the inventive engine generator unit.

FIG. 12 is a view explanatory of the behavior of the inventive engine generator unit 10. Upon power-on of the engine 40, the engine output shaft 41 causes the outer rotor 54 to start rotating, by which electric power generation by the generator 50 is initiated.

Simultaneously, the cooling fan device 60 is caused to rotate with the outer rotor 54 functioning as a magnetic rotor, so that the main fan 62 of the device 60 sucks in the outside air W1 through the air holes 71*a*, 71*b* of the recoil starter cover 71 and air sucking-in slits 82 of the fan cover 80. The thus-introduced outside air W1 flows in the space enclosed by the fan cover 80 and is discharged radially out of the space by the centrifugal force of the main fan 62. Then, the cooling air W1 flows through a cooling passage 86 to thereby cool the generator 50 and fan cover 80, after which it exits via the cooling-air outlet portion 87 of the fan cover 80. A proportion of the cooling air W1 from the cooling-air outlet portion 87 then enters the space defined by the engine shroud 111 and flows through the engine-cooling air passage 112 while cooling the outer surface of the engine 40, after which it is discharged back to the outside. Because that proportion of the cooling air W1 flowing through the engine-cooling air passage 112 has just cooled and passed only the generator 50 and thus is still at a relatively low temperature, it can cool the engine 40 with sufficient efficiency. Further, because the air sucking-in slits 82 are formed in the cooling-air inlet portion 81 of the fan cover 80, a sufficient amount of the outside air W1 can be introduced through these slits 82 into the engine generator unit 10 although the recoil starter 70 is provided in the inlet portion 81.

The remaining portion of the cooling air W1 from the cooling-air outlet portion 87, on the other hand, is diverted, via the air guide 113, upwardly into the first and second passageways 122 and 124 of the divided muffler-cooling air passage 126. The air guide 113 provides for positive and efficient diversion, and hence sufficient introduction, of the cooling air W1 into the muffler-cooling air passage 126.

More specifically, the cooling air W1 diverted via the air guide 113 flows in the first cooling-air path 122 of the divided muffler-cooling air passage 126 along the inner surface of the inner cover 123, to thereby cool the outer surface of the muffler 102. The cooling air W1 diverted via the air guide 113 also flows in the second cooling-air path 124 of the divided muffler-cooling air passage 126 along the outer cover 125, to thereby cool the outer surface of the inner cover 123. The cooling air W1 flowing through the second cooling-air path 124 functions as a heat blocking air layer, namely, an air curtain, that effectively blocks the heat transfer from the inner cover 123.

In the preferred embodiment, the outer surface temperature of the outer cover 125 can be reduced sufficiently by the cooling air W1 flowing through the two paths 122 and 124 of the divided muffler-cooling air passage 126 in the manner as described above. Further, because the proportion of the cooling air W1 flowing through the two cooling-air paths 122 and 124 has just cooled and passed only the generator 50 and thus is still at a relatively low temperature, it can cool the muffler 102 with sufficient efficiency. The cooling air W1 having thus cooled and passed the muffler 102 is discharged back to the outside.

Furthermore, the preferred embodiment can effectively reduce undesired heat radiation from the muffler 102 to the fuel tank 90, by closing the top and side portions of the muffler 102 with the heat blocking cover 121. Also, the cooling air W1 flowing between the fuel tank 90 and the muffler 102 can form an air curtain blocking the heat transfer between the two. Furthermore, with the cooling air W1 flowing through the muffler-cooling air passage 126, the outer surface temperature of the heat blocking cover 121 can be kept low so that adverse thermal influences of the muffler 102 on the fuel tank 90 can be reliably avoided even where the muffler 102 is located close to the fuel tank 90. Thus, in the preferred embodiment of the present invention, the fuel tank 90 and muffler 102 both having a great capacity can be safely positioned very close to each other, and such a great-capacity muffler 102 can reduce an undesired roar of the engine exhaust to a significant degree.

Figure 13:
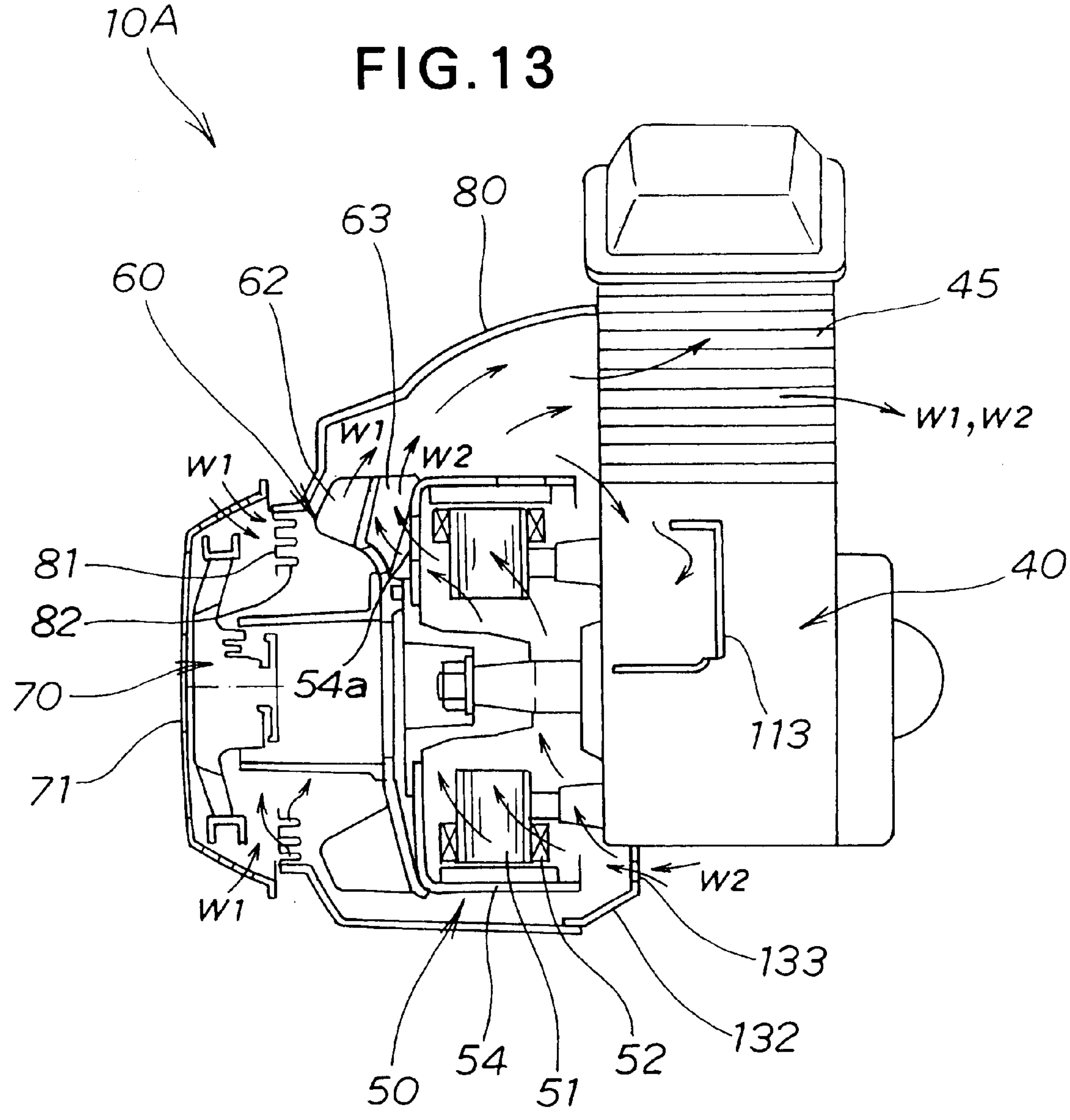
FIG. 13 is also a view explanatory of the behavior of the inventive engine generator unit.

FIG. 13 is also a view explanatory of the behavior of the inventive engine generator unit 10. The auxiliary fan 63 of the cooling fan device 60 operates to suck in the cooling air from the outside through the auxiliary cooling air inlets 133 formed in the closing plate 132. The thus-introduced cooling air W2 flows into the space defined by the outer rotor 54 to cool the stator core 51 and coils 52 and then is directed, through the air holes 54*a* formed in the bottom wall of the outer rotor 54, onto the auxiliary fan 63. Then, the cooling air W2 is discharged back to the outside by the centrifugal force of the fan 63 and merges with the above-mentioned cooling air W1 discharged via the main fan 62.

In summary, the present invention arranged in the above-described manner affords various superior benefits as follows.

The engine generator unit of the present invention is characterized primarily in that the muffler connected to the exhaust-discharging end of the engine is positioned adjacent the fuel tank in a side-by-side relation thereto, the heat blocking cover covers the top and side portions of the muffler and the heat blocking cover is placed between the opposed support members in such a way that a substantially entire top region of the space defined by the framework is covered with the fuel tank and the heat blocking cover. With the arrangements, the muffler in the inventive engine generator unit is less subject to limitations on its capacity (i.e., size) and mounting position than in the prior counterparts where the engine, generator, muffler etc. are packed together in an extremely narrow space under the fuel tank. Thus, with the present invention, the size and hence capacity of the muffler can be increased with ease. Further, the present invention can effectively reduce undesired heat radiation from the muffler to the fuel tank by closing the top and side portions of the muffler with the heat blocking cover, so that adverse thermal influences of the muffler on the fuel tank can be reliably avoided even where the muffler is located close to the fuel tank. Furthermore, the large-capacity muffler achieves enhanced performance to thereby reduce an undesired roar of the engine exhaust to a significant degree.

Because the muffler is not placed under the fuel tank in the present invention, the empty space under the fuel tank can be accessed or used with ease, and the bottom portion of the fuel tank can be increased in size, which thereby provides for an increased overall capacity of the fuel tank. Further, the fuel tank and muffler can be simplified in their shapes and flexibility in designing these components can be significantly enhanced. In addition, the inventive engine generator unit can be effectively reduced in its overall size.

With the arrangement that the cylinder of the engine is mounted in a downwardly tilted posture with respect to the general vertical axis of the engine generator unit, the overall height or profile of the engine can be significantly lowered, which leaves a relatively large empty space above the thus-lowered engine cylinder within the space surrounded by the framework. The relatively large empty space can be utilized to position the horizontal muffler substantially at right angles to the engine output shaft, with the result that a large-size muffler can be mounted.

Further, with the arrangement that the heat blocking cover is generally in the shape of an elongate semicylindrical bowl closed at opposite ends and opening downward to cover an upper surface of the muffler with the muffler-cooling air passage provided between the heat blocking cover and the muffler, the outer surface of the muffler can be cooled with cooling air flowing through the cooling air passage. Furthermore, by the presence of the cooling air passage, the heat of the muffler is not transferred directly to the heat blocking cover so that the outer surface temperature of the heat blocking cover can be prevented from getting very high.

Furthermore, with the arrangement that the muffler has its exhaust port positioned near the distal end of the cylinder of the engine mounted in the downwardly tilted posture and the control panel is disposed on a side of the engine generator unit remote from the exhaust port, the exhaust from the muffler can be prevented from flowing toward the control panel, which is therefore not thermally influenced by the muffler exhaust and can be constantly maintained in a suitable operating condition for a human operator to appropriately manipulate the panel as necessary.

Moreover, because the arrangement that the electric-power generator is of the outer-rotor/multipolar-magnet type whose outer rotor functions also as the flywheel of the engine, the dimension of the engine generator unit in the axial direction of the engine output shaft can be reduced accordingly. Further, because the fuel tank and muffler are placed side by side above the engine and generator, the engine generator unit can be constructed compactly into a generally cubic configuration and therefore can be installed appropriately in a small space. In addition, the engine generator unit can be reduced in weight and its center of gravity can be lowered for stabilized installation.

Furthermore, because the framework includes a pair of upper horizontal pipe frame portions each connecting between a predetermined pair of the vertical pipe frame portions and the pair of upper horizontal pipe frame portions provide grips that can be suitably used when the engine generator unit is to be carried by hand. Such upper horizontal pipe frame portions achieve a good weight balance of the inventive engine generator unit and allow the engine generator unit to be carried or handled with utmost facility.

With the arrangements that the engine and the electric-power generator are provided coaxially in the direction of the engine output shaft within the space defined by the framework, the engine cylinder is mounted in the downwardly tilted posture and the muffler is disposed above the engine and generator and adjacent the fuel tank in a side-by-side relation thereto, the inventive engine generator unit can be reliably kept in good weight balance with its center of gravity set substantially set at the center of the space defined by the framework. As a result, the engine generator unit can be carried and handled with great facility, using the upper horizontal pipe frame portions as grips.

What is claimed is:

1. An engine generator unit comprising:

a framework having vertical pipe frame portions at four corners thereof;

an engine;

an electric-power generator to be driven by said engine, said engine and said electric-power generator being provided coaxially in a direction of an engine output shaft within a space defined by said framework;

a fuel tank disposed above said engine and electric-power generator between a pair of support members each spanning between a different pair of the vertical pipe frame portions;

a muffler connected to an exhaust-discharging end of said engine and positioned adjacent said fuel tank in a side-by-side relation thereto; and a heat blocking cover covering top and side portions of said muffler, said heat blocking cover being placed between said pair of support members in such a way that a substantially entire top region of the space defined by said framework is covered with said fuel tank and said heat blocking cover.

2. An engine generator unit as claimed in claim 1 wherein a cylinder of said engine is mounted in a downwardly tilted posture with respect to a general vertical axis of said engine generator unit, and said muffler is mounted with a general plane thereof lying substantially horizontally above the cylinder of said engine in an orientation where a longitudinal axis of said muffler crosses the engine output shaft at right angles thereto.

3. An engine generator unit as claimed in claim 2 wherein said heat blocking cover is generally in a shape of an elongate semicylindrical bowl closed at opposite ends and opening downward to cover an upper surface of said muffler, and a cooling air passage is provided between said heat blocking cover and said muffler.

4. An engine generator unit as claimed in claim 2 wherein said muffler has an exhaust port positioned near a distal end of said cylinder of said engine mounted in the downwardly tilted posture, and a control panel is disposed on a side of said engine generator unit remote from said exhaust port.

5. An engine generator unit as claimed in claim 2 wherein said electric-power generator is an outer-rotor/multipolar-magnet generator that has an outer rotor functioning also as a flywheel of said engine, and which further comprises an electric power controller for converting an output from said outer-rotor/multipolar-magnet generator to electric power of a predetermined frequency.

6. An engine generator unit as claimed in claim 1 wherein said framework includes a pair of upper horizontal pipe frame portions each connecting between a predetermined pair of the vertical pipe frame portions, and said pair of upper horizontal pipe frame portions provide grips when said engine generator unit is to be carried by hand.

* * * * *